Patented Aug. 15, 1950

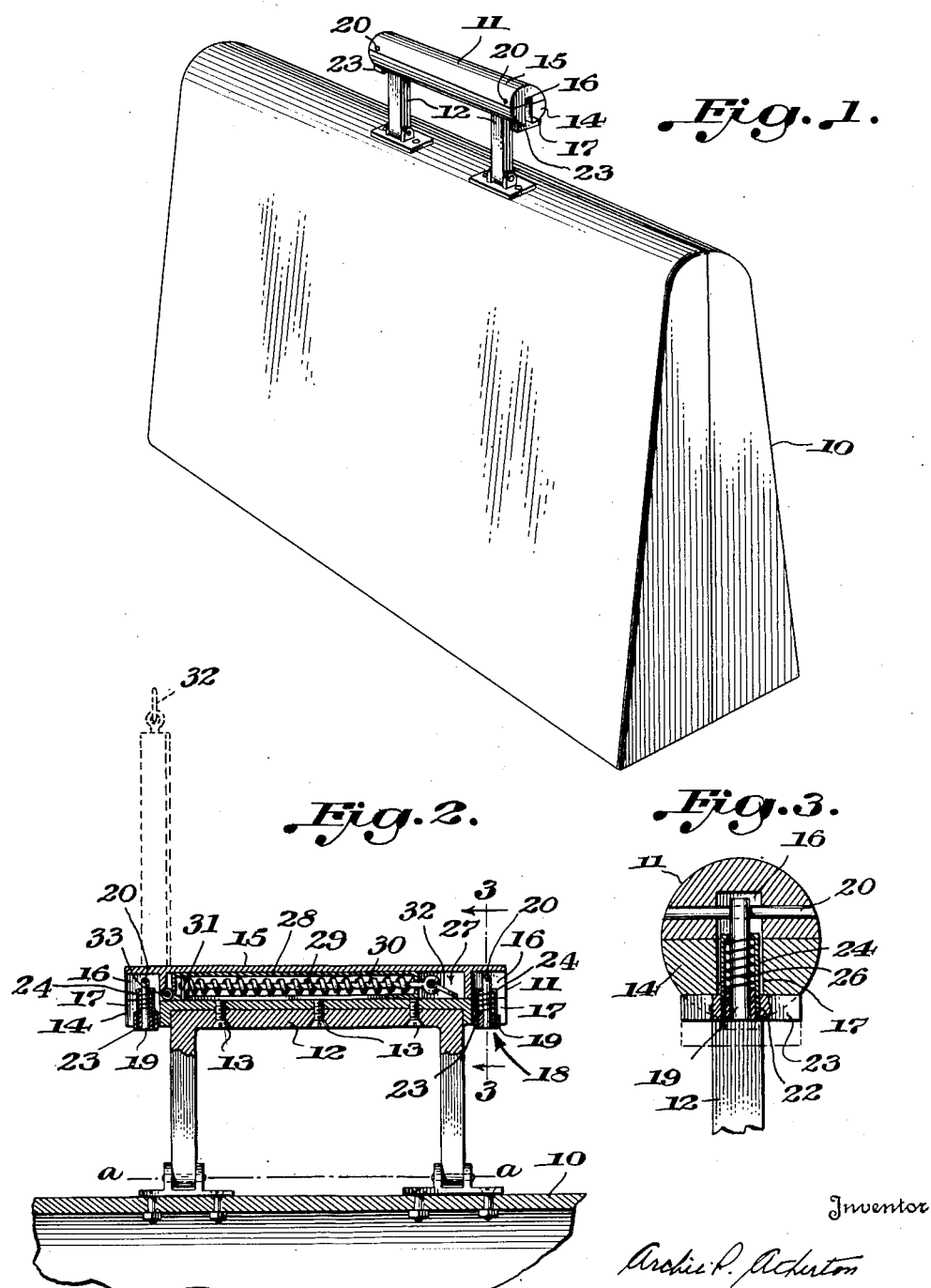

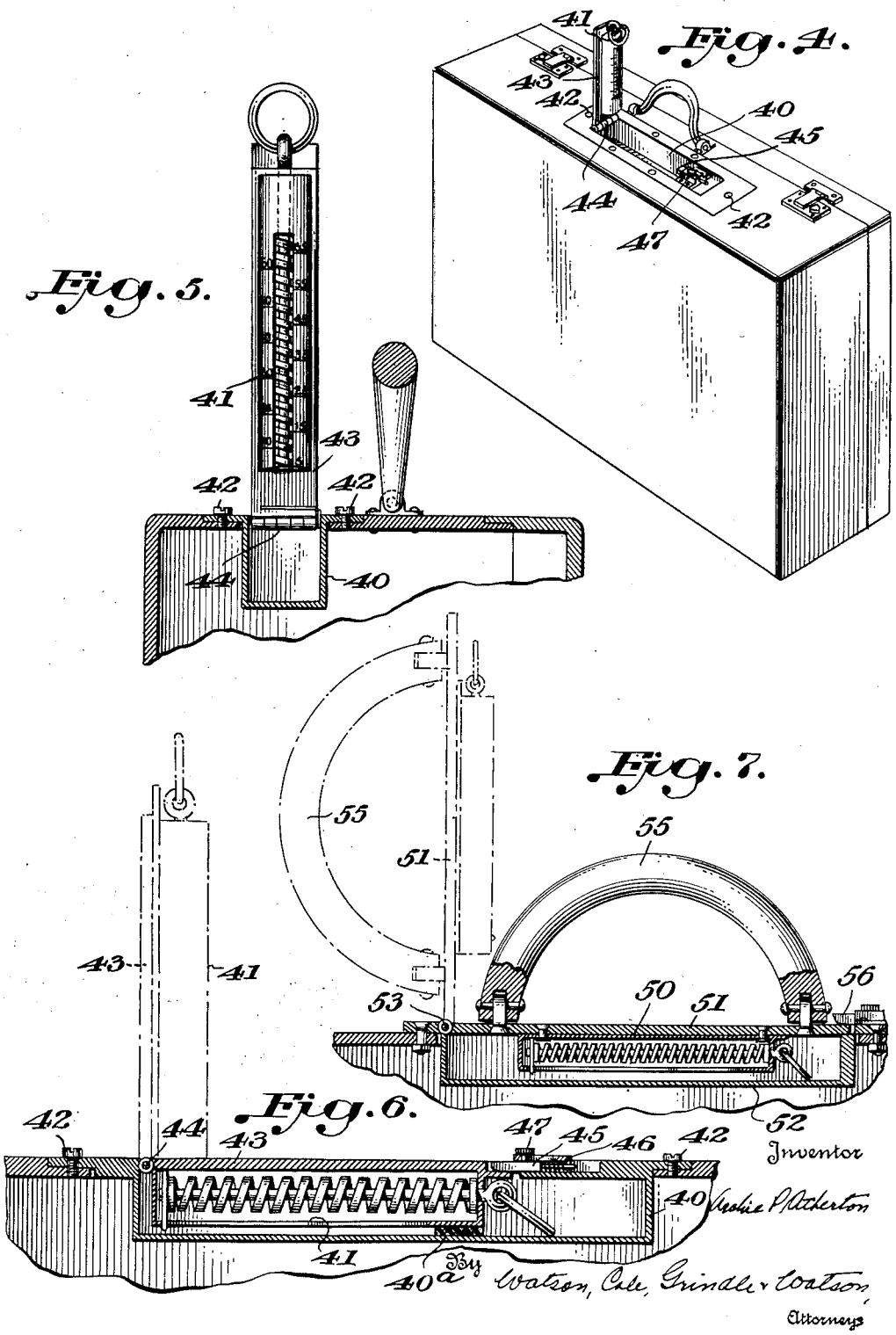

2,518,973

UNITED STATES PATENT OFFICE 2,518,973

WEIGHING DEVICE FOR SUITCASES

Archie P. Atherton, Alexandria, Va.

Application December 17, 1946, Serial No. 716,709

1 Claim. (Cl. 190—42)

The present invention relates to weighing devices for suitcases or other containers for use in the transportation of goods, particularly to weighing devices adapted to be attached to suitcases or containers to be used in the transportation of personal effects by airplane or under circumstances requiring that the weight of the container and its contents be strictly limited.

Manufacturers of hand luggage have been engaged heretofore in devising ways and means of lightening containers which are primarily intended to be used by persons who travel by airplane, the several airlines having adopted regulations which impose a relatively heavy charge upon any traveler whose hand luggage exceeds in weight an established limit. The average traveler has no convenient way of ascertaining in advance the exact weight of his suitcase and contents and is frequently surprised when he finds, at a time too late to remove any of the contents, that the total weight exceeds that established by the transportation agency as the maximum which it will transport without extra charge. The purpose of the present invention is to provide an improved means for weighing a container or article of luggage in the nature of a suitcase. A scale of simple type is provided and this scale may be so associated with the goods container as to be protected against possible injury and normally hidden from sight so that the appearance of the article of luggage will be no different, or at the most very little different, from that of similar articles which are not so equipped. The scale may be an ordinary spring scale and is preferably hingedly connected to the suitcase so that it may be swung about an axis from inoperative position, in which position it is preferably housed within a recess, to an operative position, in which position it may be used to suspend the container so that the indicator of the scale will show clearly the actual weight of container and contents.

Various specific embodiments of the invention may be readily devised in adapting the same for use with suitcases or other containers of different types and sizes. In the accompanying drawings several embodiments are illustrated by way of example and one skilled in the art will appreciate that further modifications of the invention may be devised if necessary.

In the drawings:

Figure 1 is a perspective view of one type of goods container embodying the invention, this container having an attached handle and the scale device being concealed in the handle grip;

Figure 2 is a section through that portion of the suitcase to which the handle is immediately attached, the handle being shown in side elevation, partly broken away to show the normally concealed scale device;

Figure 3 is a section on line 3—3 of Figure 2;

Figure 4 is a perspective view of a further type of goods container embodying the invention, the scale device being shown in operative position;

Figure 5 is a transverse section through the upper portion of the container of Figure 4;

Figure 6 is a longitudinal section through portion of the suitcase shown in Figures 4 and 5, the scale and its supporting means being shown in full lines in its inoperative position and in chain lines in its operative position; and Figure 7 is a view generally similar to Figure 6, the scale device and its supporting and concealing means being each specifically different from the corresponding means of the two embodiments of the invention shown in the preceding figures.

The body 10 of the container may be of any shape or construction. In the form of hand luggage illustrated in Figure 1 the body is of rigid construction but it will be understood that the invention may be incorporated in hand luggage constructions in which the container walls are flexible. To the top of the container is secured what appears to be a conventional handle member, this handle member including a grip portion generally indicated at 11, and a U-shaped member 12 to the mid-portion of which the grip portion 11 is secured as by screws 13, the extremities of the parallel legs of the member 12 being hingedly connected to the body 10 of the container so that the handle as an entirety may swing about the axis indicated by the line a—a. The fittings connecting the members 12 to the body 10 so as to permit this swinging movement may be of any conventional type.

The grip portion 11 comprises two principal parts, the part 14 which is rigidly attached to member 12 by means of the screws 13, and the cover member 15. The cover member 15 is semicylindrical and has formed in its opposite ends two recesses 16 which open downwardly and which register with slots 17 formed in the ends of part 14. Latch members generally indicated at 18 are normally housed within the spaces provided by the adjacent recesses 16 and slots 17, these members serving to detachably secure the cover member 15 to the part 14. Each includes a rod 19 pivotally hung from a cross member 20 which bridges the recess 16. Fixed upon the outer end of this rod is a sleeve-like spring abutment 22 and slidably mounted upon the member 22 is a transversely extending latching element 23. To element 23 is affixed one end of a sleeve 24 encircling the swinging rod 19 and the upper end of which is inturned as clearly shown in Figure 3 so as to closely encircle rod 19. This inturned upper end of sleeve 24 comprises a movable spring abutment and a helical spring 26 is confined between this movable spring abutment and the fixed abutment 22. The spring normally maintains the latching element 23 within a transverse notch formed in the undersurface of member 14 but is adapted to yield so that member 23 may be drawn downwardly out of the notch, to a position indicated by dotted lines in Figure 3, to permit the latch member to be swung outwardly and upwardly to disengage member 14 and thereby permit portion 15 of the grip to be lifted and removed.

This portion 15 of the grip is provided with an elongated axially extending recess 27. Within recess 27 is housed a scale which comprises the scale casing 28, helical spring 29, rod 30, indicator 31 and suspending ring 32. The scale housing is hingedly connected at one end to member 14 which is permanently attached to the body 10 of the suitcase, as by a hinge 33. After removal of the cover member 15, therefore, the scale device may be moved from the position in which it is shown in full lines in Figure 2 to its operative position, in which it is indicated in dotted lines in that figure. When in operative position the ring 32 may be grasped and the suitcase lifted, whereupon the spring 29 will be compressed and the indicator 31 will move to a point along the scale which indicates the actual weight of the container and contents. As soon as the weight has been determined the scale device may be moved downwardly to the position in which it is shown in full lines and the cover member 15 reapplied and secured in position by the latching devices at its ends. The handle presents the appearance of an ordinary luggage handle and may be applied to any existing piece of hand luggage, it being only necessary to affix the new handle to the suitcase or other container, removing the existing handle, if any.

In the form of the invention shown in Figures 4, 5 and 6 the member 40 is a rigid member which defines a recess for the scale device generally indicated at 41 and which is secured within an aperture formed in one wall of the suitcase, preferably the top wall, by securing screws 42, or other suitable fastening devices. The scale device is permanently attached to the hinged cover 43 of the recess defining member 40 and cover 43 is hingedly connected to the stationary portion of this member by hinge 44. At a point remote from the hinge the swinging cover 43 is adapted to be engaged by a sliding latch 45 of any ordinary construction and normally urged into operative position by spring 46, by which latch the cover with its associated and attached scale housing is latched in the position shown in full lines in Figure 6. By sliding the latch to the right (Figure 6) by means of a knob 47 which is attached to the latch, against the action of spring 46, member 43 may be released and may be readily swung upwardly about the axis of the hinge 44 into the position in which it is shown in chain lines in that figure. In such position the scale may be made use of to determine the weight of the suitcase and contents. After the weighing operation has been completed the scale device may be swung downwardly to the inoperative position in which it is shown in full lines, in which position it is protected against injury and hidden from view.

In the form of the invention shown in Figure 7 the scale housing 50 is rigidly attached to the undersurface of the cover plate 51 of the member 52 which defines the scale receiving recess. The cover plate 51 is hingedly connected to member 52 by a hinge 53 so that the scale may be moved from inoperative position, in which position it is shown in full lines, to operative position, in which it is illustrated in chain lines. The handle of the suitcase or other container, which is indicated at 55, is secured to the swinging cover member 51 and moves with this cover member. A latch 56 normally retains the swinging cover member 51 in the position in which it is shown in full lines in Figure 7 but may be retracted to permit it to be swung upwardly as previously described. A resilient stop 40a of rubber or the like, maintains the member 43 in close contact with the latch 45 and prevents rattling. By attaching the handle to the cover of the scale receiving recess a simplification is effected, together with some saving in cost and, in many cases, improvement in appearance.

Still other embodiments of the invention may be devised and those forms which have been described and illustrated are set forth by way of example only.

Having thus described the invention, what is claimed as new and desired to be secured by Letters Patent is:

A scale and scale housing permanently attachable to a rigid wall of a suitcase or the like, the housing comprising a chamber having an elongated opening and a flange encircling said elongated opening and attachable to said suitcase wall, an elongated member normally closing said aperture, an outer surface of said member being substantially coplanar with an outer surface of said flange, means attaching one end of said member to the housing in such manner that it may be moved into angular relationship to the plane of the flange, a manually operable latch for detachably connecting the opposite end of said member to said housing to releasably secure said member in position to close the aperture, and a scale attached to said member and normally enclosed within said housing, said scale being accessible when said member is moved to its angular or operative position so that the weight of said suitcase may be determined.

ARCHIE P. ATHERTON.

REFERENCES CITED

The following references are of record in the file of this patent:

UNITED STATES PATENTS

| Number | Name | Date |
|---|---|---|
| 634,747 | Crofford | Oct. 10, 1889 |
| 1,107,422 | Henderson | Aug. 18, 1914 |

FOREIGN PATENTS

| Number | Country | Date |
|---|---|---|
| 11,111 | Great Britain | May 5, 1910 |
| 338,631 | Germany | June 28, 1921 |